United States Patent Office 2,702,184
Patented Feb. 15, 1955

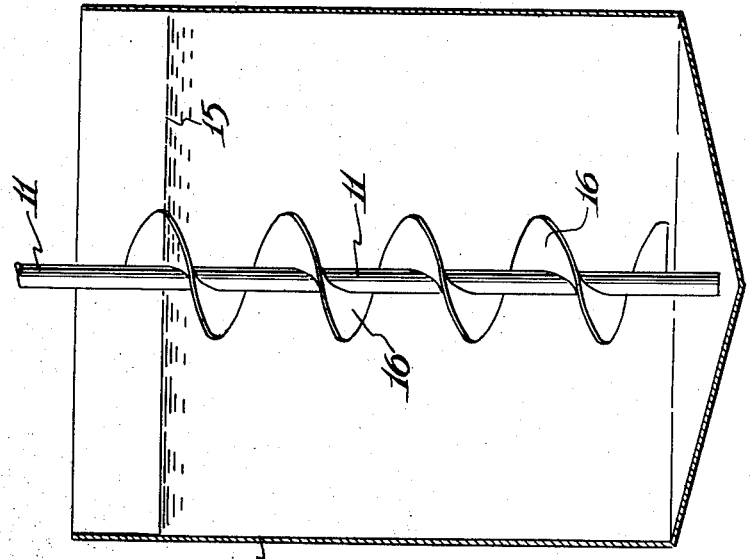
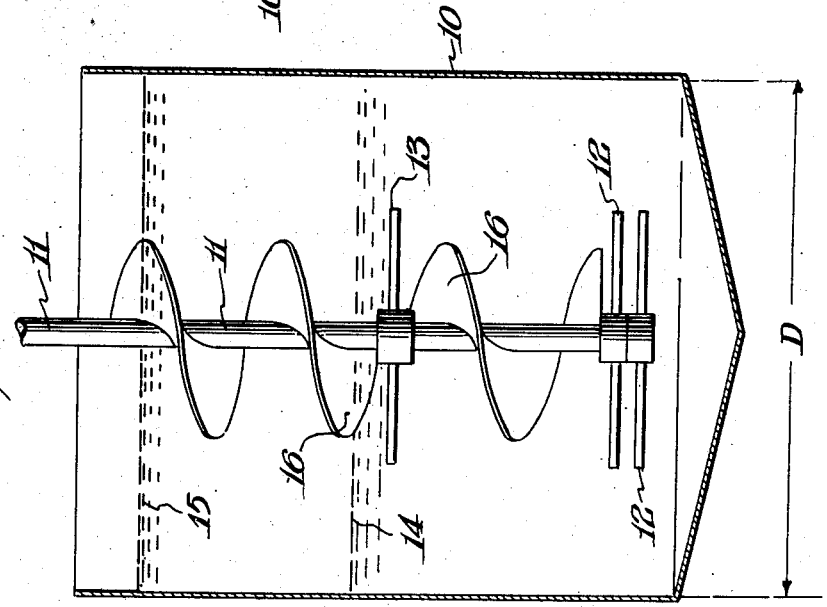

2,702,184

SCREW MIXER AND BLENDER

Andrew Starling Griffith, Jr., Waynesboro, Va., assignor to E. I. du Pont de Nemours and Company, Wilmington, Del., a corporation of Delaware Application October 26, 1951, Serial No. 253,251

2 Claims. (Cl. 259—107)

This invention relates to apparatus for mixing materials to form viscous solutions or slurries and for blending viscous fluids. More particularly the invention is directed to mixers and blenders for the preparation of thixotropic and pseudo-plastic spinning solutions from synthetic fiber-forming polymers and specifically to the preparation of solutions of acrylonitrile polymers.

The mixers most commonly used heretofore involve alone or in combination flat paddles or propellers with or without draft tubes. Screens or perforated plates in combination with means for forcing the material therethrough or other shearing and churning devices have been used in some cases. Helical screws discharging through a series of rotors and stators have also been proposed for polymer mixing and/or blending. However, none of the aforementioned apparatus has been entirely satisfactory for the production of homogeneous solutions of good filterability and good spinnability and with economy of power.

Considerable difficulty has been experienced in dissolving and blending solutions or slurries of acrylonitrile polymers and acrylonitrile copolymers such as are obtained by copolymerizing 90 to 95% acrylonitrile with 10 to 5% of 2-vinylpyridine or of 2-methyl-5-vinylpyridine. In spite of grinding the polymer to a fine powder before subjecting it to solvation action of the solvent there is a tendency for the polymer and especially the copolymer to swell, form gels, and float on the surface of the solvent before it can be thoroughly incorporated and uniformly distributed throughout the body of the solvent. Using the flat paddle or propeller type mixers which have been the most effective of the devices previously known, the following difficulties are encountered. The gels form a high viscosity layer which is difficult to submerge. As solution gradually takes place the volume of liquid in the mixer increases causing poor surface agitation as the level rises to a point between adjacent propellers or paddles. The solution climbs the agitator shaft and finally results in a viscous build-up which is difficult to remove. Due to the thixotropic character of the solution formed, flat paddles give poor recirculation and blending without resorting to excessive power input. Marine propellers operating in a draft tube are dependent upon a constant tank level.

It is an object of this invention to provide an improved mixer and/or blender that inherently avoids difficulties aforementioned. A further object of the invention is to provide a mixer that is capable of producing high quality solutions as reflected by a high filtration rate and good continuity of spinning and with economy of time and power. A still further object of the invention is to provide a blender which produces a homogeneous blend of several batch solutions of thixotropic character with a reduction in power. Other objects will be apparent from the description that follows.

The objects of this invention are accomplished by the use of a vertical, revolvable screw centered in a tank, preferably cylindrical, and having a diameter of from 0.4 to 0.2 times the inside diameter of the tank. The screw is of such length that a portion always projects above the surface of the solution and preferably this free projection amounts to at least one-fourth pitch. A square pitch screw is preferably used, i. e. the diameter of the screw equals the pitch of the screw. However, the screw pitch may be from two-thirds to three-halves the screw diameter. Screw pitches and diameters outside these values do not give as good results with viscous materials and, therefore, screws of the stated design are normally used. For mixing it is desirable to have at least one shearing blade mounted from the screw shaft preferably below the bottom of the screw and two or three or more blades may be used to advantage. The additional blade or blades may take the form of a flat paddle, a circle of radially extending pins, a propeller blade or other shearing means. Otherwise, the screw alone is the sole mixing means, there being no draft tube or fixed or moving blades cooperating with the screw. The apparatus thus comprises a tank, and centered in said tank, a sole mixing means comprising a vertical, revolvable discontinuous screw comprising a shaft having helical rib sections mounted thereon, said screw having a diameter of about 0.2 to about 0.4 times the inside diameter of said tank and a screw pitch about two-thirds to three-halves the screw diameter and said shaft bearing a plurality of shearing means, one of which is positioned near the center of said shaft between adjacent helical rib sections and the others of which are positioned at the bottom end of said shaft. The shearing means that are used are normally flat paddles.

In the drawings, Figure 1 illustrates a suitable screw blender which also is a mixer and Figure 2 illustrates the satisfactory screw blender.

With reference to Figure 1, a cylindrical tank 10 of diameter D and an overall height somewhat greater than D is equipped with rotatable shaft 11 carrying an interrupted screw as shown. The pitch of the screw is three-eighths D as is the diameter of the screw. At the bottom of the shaft are located two flat paddles 12, one-half D in diameter and a fraction of an inch wide. Between the screw sections 16 is another flat paddle 13 of the same dimensions.

For mixing a finely ground copolymer of acrylonitrile and 2-vinylpyridine in dimethylformamide, this arrangement was compared with a prior mixing arrangement consisting of two three-bladed square pitch propellers in the same relative positions and of the same diameter as the screw sections. In each case the solution was 26 to 26½% concentration and mixing was carried out at 40° C. ±2° C. Power input for the screw mixer of this invention amounted to 45 horsepower per thousand gallons whereas the prior mixing arrangement required 60 horsepower per thousand gallons of solution. From this and other tests it was shown that build-up of solutions above the liquid level was considerably reduced, the solution homogeneity was much improved, and the volume of solution that could be prepared in the same capacity vessel was increased about 20% by the use of the apparatus of this invention. This capacity increase results because with the prior mixer considerable freeboard space was necessary at the top of the tank to allow for solution climbing the shaft which free space is not at all necessary with the screw mixer of this invention.

Referring again to Figure 1 where the initial solvent level 14 and the final solution level 15 are shown, it is readily apparent that the liquid volume increased about 50% during the mixing cycle and very little free space remained above the level of the final solution. On the other hand, good mixing efficiency can be obtained in the same size vessel with half the initial solvent or less should it be desirable for some reason or other to prepare a small mix.

Similar results were obtained by using other than square pitch screws, for instance, a screw having a diameter of one-fourth the tank diameter and a pitch of three-eighths the tank diameter was very satisfactory as was a screw having a diameter of three-eighths the tank diameter and a pitch of one-quarter the tank diameter. The rate at which the polymer could be submerged was greater in the case of screws of the higher pitch ratio but blowing of the polymer was also somewhat greater.

The screw mixer of this invention develops a strong downward pull and the particles before or after swelling are soon well distributed throughout the solvent body. The shearing blades which are of larger diameter than the screw cut through the downward moving streams and deflect or push the streams outward. There are no dead spots in the screw mixer as there are in the propeller type mixers and a homogeneous solution is soon attained with the expenditure of considerably less power.

With reference to Figure 2, a single continuous screw is used in a cylindrical tank 10 of diameter D. In this case, both the diameter and pitch of the screw are one-quarter D. Using this arrangement or a screw other than with a square pitch such as previously described, a recirculation time of about six minutes could be obtained at a power input of less than 1 horsepower per thousand gallons of solution having a viscosity of 1800 poises at 50° C. In addition to lower power consumption for the same rate of recirculation, the operability and effectiveness of the screw blender is independent of the solution level. This is indeed, a decided advantage for heretofore propeller location, size and location of draft tubes, etc. had to be adjusted according to the liquid level in the tank for effective blending. Furthermore, good blending can be obtained over a wide range of shaft rotational speeds as for example, from 20 to 50 R. P. M. and the amount of power used is independent of the speeds within this range for effecting recirculation of a given volume of solution. Accordingly, it is frequently desired, because of the economy involved, to use the apparatus shown in Figure 2 rather than that shown in Figure 1 although either may be used in blending operations. If mixing is desired along with the blending, the apparatus of Figure 1 will be advantageously employed.

Any departure from the above description which conforms to the present invention is intended to be included within the scope of the claims.

I claim:
1. Apparatus for blending viscous materials which comprises a tank, and centered in said tank, a sole mixing means comprising a vertical, revolvable discontinuous screw comprising a shaft having helical rib sections mounted thereon, said screw having a diameter of about 0.2 to about 0.4 times the inside diameter of said tank and a screw pitch about two-thirds to three-halves the screw diameter and said shaft bearing a plurality of shearing means, one of which is positioned near the center of said shaft between adjacent helical rib sections and the others of which are positioned at the bottom end of said shaft.

2. Apparatus in accordance with claim 1 wherein said shearing means are flat paddles.

References Cited in the file of this patent
UNITED STATES PATENTS

| | | |
|---|---|---|
| 125,255 | Bankerd | Apr. 2, 1872 |
| 286,384 | Caine | Oct. 9, 1883 |
| 630,309 | Aberg | Aug. 8, 1899 |
| 787,143 | Barros | Apr. 11, 1905 |
| 896,848 | Mills | Aug. 25, 1908 |
| 1,284,945 | Swan | Nov. 12, 1918 |
| 1,565,970 | Stanzel | Dec. 15, 1925 |
| 2,016,647 | McMartin | Oct. 8, 1935 |